Patented Nov. 4, 1941

2,261,769

UNITED STATES PATENT OFFICE 2,261,769

PROCESS OF MANUFACTURING RUBBER ARTICLES

Hubert F. Jordan, Nutley, N. J., assignor to United States Rubber Company, New York, N. Y., a corporation of New Jersey No Drawing. Application August 22, 1939, Serial No. 291,306

2 Claims. (Cl. 260—821)

This invention relates to a process of manufacturing rubber articles, and more particularly to a process of manufacturing rubber articles from heat-sensitive latex compositions.

The manufacture of rubber articles by processes involving the gelling of heat-sensitive latex compositions as by dipping heated forms in a heat-sensitive latex, or by extruding the heat-sensitive latex through a heated nozzle, or by pouring a heat-sensitive latex into a mold and thereafter heating so as to gel the latex in the mold, is well known. It is known to wash the gelled mass in water before evaporating the water from the gel, to form the finished rubber article. Where the latex is gelled on a form which remains in contact with the gel throughout the drying period, as is the case in the manufacture of latex articles by dipping, the washing of the gel is primarily for the purpose of removing water soluble substances from the gelled mass before drying said mass to form the finished rubber article. Where the gelled article is removed from the form after gelling as in the case of articles gelled either in a hollow mold, or in a mold consisting of a shell and core, the water bath serves as a fluid supporting medium to permit the rubber gel to shrink or synerize without distortion. The syneresis, or shrinking of the gel and expression of water therefrom, in any case, toughens the gel sufficiently so that it may then be dried in a gaseous atmosphere without distortion.

The present invention has for its object the increasing of the rate of syneresis of gelled rubber articles in an aqueous bath so as to shorten the time necessary for obtaining the desired loss of water from the gel and the desired shrinkage in the syneresis bath.

Accordingly, I have discovered that the rate of syneresis of a gelled latex article in an aqueous bath is greatly increased if the pH of the bath is below 5.5.

In carrying out the present invention, a heat-sensitive latex composition is gelled in the desired shape, after which the gel is allowed to synerize in an aqueous bath having a pH below 5.5 and is subsequently further dried by the evaporation of water from the gel. The preparation of heat-sensitive latex compositions is well known. For example, the latex may be heat-sensitized by the addition thereto of a small amount of a heat-sensitizing agent, such as a polyvalent metal salt, or a disubstituted guanidine, or a mixture of zinc oxide and an ammonium salt of a strong acid. The latex may also be heat-sensitized in a known manner by the addition thereto of a small amount of a compound, such as ammonium persulphate, which forms an acid on heat decomposition, or by the addition of a material such as sodium silico fluoride, which besides sensitizing the latex to heat, will cause it to gel at room temperature after standing a more or less extended period of time without the application of heat. The heat-sensitive latex may be gelled in various ways as by dipping a heated form into a bath of the heat-sensitive latex composition and building up the desired thickness of latex gel, or by dipping a form into the heat-sensitive latex and removing and thereafter heating to gel the latex, or by the extrusion of the heat-sensitive latex through a heated nozzle, or by the extrusion of the heat-sensitive latex through a nozzle into a heated fluid medium, or by pouring the heat-sensitive latex into a mold and heating so as to gel the latex, or, where the heat sensitive latex is also capable of gelling at normal temperatures, permitting the mold containing the latex, for example, to stand until such gelling has taken place. The gelled latex is then allowed to synerize in an aqueous bath having a pH below 5.5, as by immersing the dipping mold coated with the latex gel into the bath, or by passing a continuous length of the gel through such a bath, or by removing the gelled article from the dipping form or casting mold, and allowing the article without the form to synerize in the bath. The pH of the bath may be regulated in known manner, as for example by the addition to the water of an acid and its salt, such as acetic acid and sodium acetate. The gel may be permitted to synerize in the bath, which may be at room or elevated temperature, until the desired effect has been accomplished, namely, until the desired amount of water has been expressed from the gel, and the gel has become sufficiently tough so that it can be further dried in a gaseous medium without distortion or uneven shrinking. After the gel has been thus allowed to synerize to the desired extent, it may then be transferred to a gaseous drying medium, such as air, at room or elevated temperature, for further drying to produce the finished rubber article. After drying, the article may be further heated or otherwise treated to vulcanize the same, if not previously vulcanized.

The following is illustrative of the present invention: A latex composition was first prepared according to the following formula:

| | Parts by weight (Dry weight) |
|---|---|
| Rubber (as 60% centrifuged latex) | 100 |
| Ammonia | 0.2 |
| Potassium hydroxide | 1.3 |
| Potassium oleate | 1.0 |
| Sulphur | 2.0 |
| Antioxidant | 0.5 |
| Accelerator | 0.8 |
| Carbon black paste | 1.0 |
| Zinc oxide | 3.0 |
| Ammonium alginate | 0.2 |

Total solids 54%

The ammonia was reduced from the normal ammonia content of .65% to .2% by the addition of the calculated amount of formaldehyde to the latex. The compounding ingredients were added in the form of aqueous solutions, or pastes. The above compound was heat-sensitized shortly before use by the addition thereto of 10 parts (wet weight) of a 20% solution of ammonium nitrate containing .2% of added free ammonia, this solution together with the zinc oxide, acting to heat-sensitize the compound.

A number of gelled articles were made by pouring samples of the above heat-sensitive latex compound into a three piece mold constructed of machined aluminum which when assembled had a rectangular internal cavity 7.5″ square and .125″ thick (7½″ x 7½″ x .125″). The latex samples in the mold were gelled irreversibly by immersing the mold containing the latex in a water bath heated to 90° C., from 5 to 10 minutes, after which the mold was removed from the water bath, opened, and the gelled articles or plates containing approximately 45% water removed. The gelled articles thus formed were allowed to synerize at 25° C. in aqueous baths at various pH's for various periods of time, after which they were dried in an air drier at 80°. The final size of the dried rubber plates was 6″ x 6″ x .10″. The aqueous baths were prepared by known methods involving the addition to water of acids and their salts in predetermined proportions. For each case, the pH was determined by the use of the glass electrode. The following table shows the loss of water from the original gel containing approximately 45% of water when allowed to synerize for various lengths of time in aqueous baths having various pH values.

| pH of syneresis bath | Per cent water lost from gelled articles after various lengths of time in syneresis bath as follows: | | | | |
|---|---|---|---|---|---|
| | 1 hr. | 2 hrs. | 3 hrs. | 4 hrs. | 24 hrs. |
| 1 | 21.1 | 23.5 | 25.1 | 25.9 | 30.1 |
| 1.7 | 18.2 | 21.5 | 22.2 | 22.8 | 28.1 |
| 3.3 | 17.2 | 20.7 | 22.1 | 22.7 | 27.4 |
| 4.0 | 16.0 | 19.9 | 21.1 | 22.2 | 26.5 |
| 4.5 | 16.0 | 21.4 | 22.7 | 23.9 | 28.4 |
| 5.4 | 9.8 | 15.1 | 17.6 | 19.0 | 23.8 |
| 6.8 | 7.7 | 10.0 | 12.7 | 15.2 | 21.4 |
| 8.4 | 6.7 | 8.6 | 11.5 | 13.9 | 17.6 |
| 10.9 | 5.2 | 7.2 | 9.0 | 11.2 | 12.1 |

It may be seen from the above table that the rate of syneresis in baths having a pH below 5.5 is much faster than the rate of syneresis of the gel in plain water or aqueous baths having a pH above 7. Where the article is to be vulcanized after syneresis, it is preferable not to have the pH of the syneresis bath below 3, as zinc oxide is somewhat soluble below a pH of 3, and hence the bath at these low pH's may remove much of the zinc oxide desirable for later vulcanization. Accordingly, the most favorable pH range for the syneresis bath is from 3 to 5. Where the latex is prevulcanized, the pH before gelling may be maintained below 3, providing of course such acidic solutions do not dissolve compounding ingredients desired in the finished rubber article.

In view of the many changes and modifications that may be made without departing from the principles underlying the invention, reference should be made to the appended claims for an understanding of the scope of the invention.

Having thus described my invention, what I claim and desire to protect by Letters Patent, is:

1. The process of manufacturing a rubber article which comprises irreversibly gelling a latex composition containing a heat-sensitizing agent in the desired shape, allowing the gel to synerize for at least one hour in an aqueous bath having a pH below 5.5, and further drying the gel by evaporation of water therefrom.

2. The process of manufacturing a rubber article which comprises irreversibly gelling a latex composition containing a heat-sensitizing agent in the desired shape, allowing the gel to synerize for at least one hour in an aqueous bath having a pH between 3 and 5, and further drying the gel by evaporation of water therefrom.

HUBERT F. JORDAN.